United States Patent [19]

Mitchell et al.

[11] 4,283,432
[45] Aug. 11, 1981

[54] NATURAL BEVERAGE POWDERS FROM DAHLIA EXTRACTS

[76] Inventors: William A. Mitchell, 175 Jacksonville Rd., Lincoln Park, N.J. 07035; John L. A. Mitchell, 108 Mattek, DeKalb, Ill. 60115; Cheryl R. Mitchell, 375 Northgate Dr., Apt. #2, Manteca, Calif. 95336

[21] Appl. No.: 177,934

[22] Filed: Aug. 13, 1980

Related U.S. Application Data

[63] Continuation-in-part of Ser. No. 973,856, Dec. 12, 1978, abandoned.

[51] Int. Cl.³ .............................................. A23B 4/04
[52] U.S. Cl. .................................. 426/466; 426/489; 426/584; 426/590; 426/593; 426/594; 426/597; 426/655
[58] Field of Search ............... 426/466, 468, 469, 489, 426/580, 584, 590, 594, 596, 655, 593, 597, 518

[56] References Cited

U.S. PATENT DOCUMENTS

Re. 18,523  7/1932  Miles et al. ............................ 426/655
1,189,132  6/1916  Kellogg ................................ 426/596

OTHER PUBLICATIONS

Bruttini, *Uses of Waste Materials*, (1923), pp. 72–73.
Winton et al., *The Structure and Composition of Foods*, (1935), pp. 171–174.

*Primary Examiner*—Peter Chin

[57] ABSTRACT

This invention concerns the extraction of the water solubles of the dahlia tuber which contains aroma and flavor bodies and the concentration, drying, and roasting of these extracts to produce additional flavor bodies. The roasted and ground flavorsome beverage powders so produced can be used to make palatable beverages in hot or cold milk or water. Furthermore the above beverage powders can be blended in concentrations of 1 to 99% with the flavor powders of coffee, tea or cocoa to produce flavor powders that complement each other when used to make water or milk beverages. Another objective is to blend the dahlia flavor powders with sugar or sugar mixtures to make sweetened beverage powders. Such sweetened beverage powders can again be blended with the powders of coffee, tea or cocoa.

10 Claims, No Drawings

NATURAL BEVERAGE POWDERS FROM DAHLIA EXTRACTS

This is a continuation-in-part of application Ser. No. 973,856, filed Dec. 12, 1978, abandoned.

BACKGROUND OF THE INVENTION

This invention relates to natural beverage powders produced from dahlia tuber extracts and the uses of these natural beverage powders to make flavorsome beverages.

In the past, natural beverage powders have been produced from roasted seeds such as the coffee berry, wheat, rye and barley. The roasted leaves or roots of some plants or their extracts can also be made into powders which will produce good tasting beverages. The latter materials would include dried tea leaves and the roasted roots of the chicory and dandelion plants. The sugars present in the above seeds and roots appear to be one of the prime sources of flavor development on roasting. Several hypotheses have been presented for the development of flavor:

(a) the interaction of the sugars with the basic groups of the protein or protein hydrolysate, (b) the degradation of sugars (eg. the carmelization of sucrose, glucose or fructose), (c) the liberation of esters, ketones, acids, aldehydes and basic material which are flavor bodies themselves, (d) the interaction of all of the above to produce flavorable materials.

In addition to the above there are flavor and aroma materials present in parts of many raw plants such as those present in tea leaves. However, for most roasted seeds and roots only minor flavor bodies are produced, many times aromas and flavors objectional to the human taste are developed.

SUMMARY OF THE INVENTION

We have discovered a delicate flavor blend in the dahlia tuber. Furthermore, when the water soluble extract of the dahlia tuber is dehydrated and roasted, more flavor and aroma bodies can be made. The powders produced by roasting these dried extracts give excellent beverages in water or milk. We have found that when the above beverage powders are made into blends with the present beverage powders, such as those of coffee, tea or cocoa, very tasty beverages can be made in which the dahlia flavors complement those of the coffee, tea or cocoa. Therefore one can look upon the dahlia flavor powders as good extenders for the above natural flavor powders. As far as is known, none of the above dahlia flavor and aroma bodies have been characterized to date.

It is the purpose of this invention to extract the water solubles, containing the aroma and flavor bodies, of the dahlia tuber, and to conserve these flavor notes, as much as possible, while drying and roasting this extract.

A second objective is to use the water solubles of the dahlia tuber, which contain carbohydrates, proteins and minerals, as the basic material to be dried and roasted for further flavor development.

A third objective is to use the above dahlia beverage powders to produce beverages in milk or water.

A fourth objective is to blend the dahlia beverage powders with the powders of coffee, tea or cocoa.

A fifth objective is to blend the above dahlia beverage powders with sugars or dextrins.

DESCRIPTION OF THE INVENTION

The high yield of water solubles of the dahlia tuber is shown in Table I.

TABLE I

| Average Dahlia Tuber Composition | |
|---|---|
| Moisture | 79.5% |
| Solids | |
| water soluble | 17.0% |
| water insoluble | 3.5% |
| | 100.0% |

The presence of high fructose containing carbohydrates is shown in Table II.

TABLE II

| Average Composition of Dahlia Juice (dry basis) | |
|---|---|
| Carbohydrates containing fructose | 79.4% |
| Proteins, minerals, other carbohydrates, etc. | 20.6% |
| | 100.0% |

The chief fructose polymer is inulin (molecular weight approximately 5,000), but there is also present a mixture of smaller fructose polymers called inulides. The above materials contain reducing end-groups which can react with the amino groups of the proteins to undergo color and flavor reactions. Furthermore, on roasting, fructose polymers can undergo hydrolysis as well as caramelization (decomposition) reactions to produce flavor and aroma bodies. By controlling the degree of roast of the drying or dried dahlia extract, by time and temperature limitations, we have discovered highly desirable flavor and aroma materials. As with coffee, roasting to a light roast is required for some uses, while a dark roast is more desirable for other purposes. Greater control of the flavor reaction is obtained when lower temperatures are used in roasting. For example, at 105° C. a delightful, light-colored, roasted flavor product can be obtained. These light roasts retain much of the basic flavors and aroma present in the freshly extracted dahlia tuber.

On the other hand, when the flavor-producing reaction is carried out at 250° C. only a short time is required to produce a dark roast. It should be understood that if the concentrated dahlia extract is dried below about 100° C. then a light-colored, dried product is made; if the drying step is carried out at temperatures above about 105° C. then darker dried products are obtained. At the higher drying temperatures part of the flavor development can take place. Normally, when a light roast is required, temperatures of drying of from about 50° C. to 102° C. are used. The flavor development reaction is then carried out by heating between about 102° C. and 120° C. oven temperature for periods of about 3 minutes to about 45 minutes. The time required is dependent upon the roast color required, the mass to be roasted and how well the extract has been dried.

If a darker roast is required then the drying step can be carried out at temperatures well over 105° C. while the roasting temperature can be increased for short period roasts from 120° C. to 225° C. Above about 225° C. it becomes more difficult to control roast color and decomposition. As can be seen, the drying and flavor producing steps overlap and can be carried out in a single step, if desired.

We wish to disclose a dahlia flavor powder of 10 to 100 U.S. standard mesh made from the water solubles of the dahlia tuber. The flavor powder is made by first extracting the water solubles in 15 to 25% weight concentration by grinding the tuber then pressing and filtering the comminuted tuber to remove insolubles. Drying of the extract to 70–99% weight concentration is done at 50° C. to 110° C. The dried extract is roasted for periods of 3 minutes to 2 hours at temperatures from 102° to 225° C., then reduced to a powder of 10 to 100 U.S. Standard mesh by grinding. The above flavor powder can be used directly at 0.3% to 10% concentration by weight in hot or cold water or milk to prepare beverages.

The dahlia flavor powder can also be used for blending at 1% to 99% by weight with the flavor powders of coffee, tea or cocoa.

Furthermore, the dahlia flavor powder can be used to make a sweetened flavor powder by blending the basic dahlia flavor powder at from 3 to 95% by weight with sugars consisting of those of sucrose, dextrose, lactose, fructose, soluble hydrolyzed cereal solids of from 5 to 50 D.E. or mixtures of the above sugars.

Also, the basic dahlia flavor powders can be blended with the flavor powders of coffee, tea or cocoa at 1 to 99% concentration by weight and then further blended with sugars at 3% to 95% concentration by weight; the sugars consisting of those of sucrose, dextrose, lactose, fructose, soluble hydrolyzed cereal solids of from 5 to 50 D.E. or mixtures of these sugars.

The dahlia flavor powder blended at 3 to 95% concentration by weight with sugars consisting of those of sucrose, lactose, dextrose, fructose soluble hydrolyzed cereal solids of from 5 to 50 D.E. or mixtures of the above sugars can be further blended at 1 to 99% concentration with the powders of coffee, tea or cocoa to produce sweetened flavor powders.

Beverages from all of the above dahlia flavor powder blends can be made at 0.3% to 10% concentration by weight in hot or cold water or milk.

Having outlined the basis for our invention we will now show, by example, how the dahlia flavor powders can be produced, and the uses that can be made of them.

EXAMPLE 1

Extraction of the Water Solubles of the Dahlia Tuber

Freshly dug, turgid, dahlia tubers (1.2 kg) were washed and scrubbed in cold water. One kg of the scrubbed tuber was ground in a Waring Blendor to the consistency that would allow the slurry to pass through a number 10 U.S. Standard sieve. The ground material was filtered through three layers of cheese cloth (to remove insolubles), and finally pressed to remove the remaining solubles. A yield of 700 ml of a colloidal liquid was obtained which contained 21% solids and a pleasing aroma and flavor.

EXAMPLE 2

Preparation of a Light Roast Dahlia Flavor Powder

An extract was made of the dahlia tuber as given in Example 1. The extract was transferred to a 1-liter, 3-necked, round-bottom flask set up for vacuum distillation with water condenser, stirrer, thermometer and vacuum line attached. The flask was heated with an electric heating mantle while a vacuum of 100 mm of mercury was pulled on the system. The distillation of water plus some aroma was carried out until a tan syrupy liquid of 70% solids was obtained. At first copious amounts of white to grey inulin separated, but on concentration much of the inulin was incorporated in the syrupy mass. The syrup was transferred to an evaporating dish which was placed in an air oven at 110° C. After drying and roasting for about one hour in an oven at 110° C. a brittle, light brown flavor mass was obtained. This was cooled, and subsequently ground in the Waring Blendor. The ground mass was sieved through a 20 mesh U.S. Standard screen to produce the basic light roast dahlia flavor powder.

EXAMPLE 3

Preparation of a Dark Roast Dahlia Flavor Powder

An extract of the dahlia tuber was made as described in Example 1. The extract was transferred to a 1-liter beaker, and concentrated at atmospheric pressures over an electric hot plate to about 80% solids. Again copious amounts of inulin separated at first, but later this material was largely incorporated into the tan-to-brown syrupy mass. The beaker containing this syrupy mass was placed in an air oven for drying and roasting at 170° C. After about ½ hour a deep, dark brown, brittle mass was obtained. The product was cooled, ground in the Waring Blendor and then sieved through a 20 mesh U.S. Standard screen to produce a dark roast, dahlia flavor powder.

Example 4

Preparation of a Hot Water Beverage

Six grams of the dahlia flavor powder of Example 2 were added, with stirring, to a cup of boiling hot water. This produced a hot beverage resembling normal tea extracts which was found to be pleasing to both adults and children.

EXAMPLE 5

Preparation of Cold Milk Beverage

Seven grams of the dahlia flavor powder prepared in Example 3 were added, with stirring, to a cup of cold milk. A delightful beverage, which was found to be very acceptable to children, was made.

EXAMPLE 6

Blending the Dahlia Flavor Powder with Soluble Coffee

A blend was made of 40 grams of the dahlia flavor powder of Example 2 with 60 grams of a commercial instant coffee, to produce a coffee blend product. One teaspoonful of this blended powder was put into a cup of hot water and stirred. A smooth tasting beverage was made from which many of the harsh notes of normal instant coffee were missing.

EXAMPLE 7

Blending of the Dahlia Flavor Powder with Cocoa

A blend was made of 45 grams of the dahlia flavor powder of Example 3 with 55 grams of commercial instant cocoa mix. Two heaping teaspoonsful of the prepared powder blend were added, with stirring, to a cup of cold milk to produce a well flavored beverage.

EXAMPLE 8

Blending of the Dahlia Flavor Powder with Soluble Tea

A blend was made using 48 grams of the dahlia flavor powder of Example 2 and 52 grams of a commercial soluble tea. One level teaspoonful of the above blended powder was added to a cup of hot water. An excellent tea beverage was made in which the two flavor sources complemented one another.

EXAMPLE 9

Blending of Dahlia Flavor Powders with Sweetners

A blend was made using 70 grams of the dahlia flavor powder of Example 2 and 30 grams of a fine granulated commercial sugar. A sweetened milk beverage was made by adding 3 teaspoonsful of the prepared mixture to a cup of hot milk.

EXAMPLE 10

Blending the Dahlia Flavor Powder with Non-Sweetner Soluble Carbohydrates

A blend was made of 48 grams of soluble cereal solids of 10 D.E. (Corn Products MOR-REX 10) and 52 grams of the dahlia flavor powder of Example 3. Two heaping teaspoonsful of the blended powder were added to a cup of boiling water. A non-sweetened hot beverage with good mouth feel, flavor and aroma, was produced.

EXAMPLE 11

Sweetened Dahlia Flavor Powder Blends with Soluble Coffee

Eighty grams of the sweetened dahlia powder of Example 9 were blended with 20 grams of commercial soluble coffee. Three teaspoonsful of the resulting powder were stirred with a cup of hot water to produce a pleasing, sweetened, blended coffee beverage.

EXAMPLE 12

Dried Roasted Dahlia Extract

A dahlia extract was made as in Example 1. A 100 ml portion of the extract was placed in an evaporating dish and allowed to dry in an air oven at 75° C. On drying the white inulin first settled, then the inulides and the dark, brown colored protein-containing layer. The large dried chunks of material were ground to pass through a 20 mesh U.S. Standard sieve. The powder was heated in an air oven at 130° C. for 20 minutes when a light brown roast dahlia flavor product was obtained. The melted flavor product was hardened by cooling to room temperature, and then ground and sieved through a 20 mesh U.S. Standard sieve to produce a light brown dahlia flavor powder suitable for beverage use.

The above examples in no way limit the scope or spirit of the invention.

Having described in detail our invention, what we claim is:

1. The dahlia flavor powders produced by: (a) grinding scrubbed dahlia tubers to about 10 mesh U.S. Standard particle size to release the soluble solids of the tuber; (b) separating the soluble solids of step (a) in 15% to 25% concentration by weight by filtering and pressing from the insoluble solids; (c) concentrating the soluble solids of step (b) to a thick syrup or solid of from 70% to 99% solids at temperatures of from 50° C. to 110° C; (d) heating or roasting the syrup or solid of step (c) between temperatures of 102° C. and 225° C. for periods of 3 minutes to 2 hours; (e) grinding the roasted product of step (d) to produce dahlia flavor powders of 10 to 100 mesh U.S. Standard.

2. The beverage powders produced by blending of the basic dahlia flavor powders of claim 1 with the powders of coffee, tea or cocoa at from 1% to 99% concentration by weight.

3. The beverage powders produced by blending the basic dahlia flavor powders of claim 1 at 3% to 95% concentration by weight with sugars; the sugars consisting of those of sucrose, dextrose, lactose, fructose, soluble hydrolyzed cereal solids of 5 to 50 D.E. or mixtures of the said sugars.

4. The beverage powders produced by blending the beverage powders of claim 2 with sugars at 3% to 95% concentration by weight, the sugars consisting of those of sucrose, dextrose, lactose, fructose, soluble hydrolyzed cereal solids of 5 to 50 D.E. or mixtures of these sugars.

5. The beverages made from the basic dahlia flavor powders of claim 1 at 0.3% to 10% concentration by weight in hot or cold milk or hot or cold water.

6. The beverages made from the dahlia flavor powders of claim 2 at 0.3% to 10% concentration by weight in hot or cold milk or hot or cold water.

7. The beverages made from the dahlia flavor powders of claim 3 at 0.3% to 10% concentration by weight in hot or cold milk or hot or cold water.

8. The beverages made from the dahlia flavor powders of claim 4 at 0.3% to 10% concentration by weight in hot or cold milk or hot or cold water.

9. The process for making dahlia flavor powders by grinding, pressing and filtering dahlia tubers in order to extract the water soluble solids in 15% to 25% concentration by weight from the insoluble solids, then concentrating said extract to a thick syrup or solid of from 70% to 99% solids at temperatures of 50° C. to 110° C., then heating or roasting of said concentrated extract between 102° C. and 225° C. for periods of 3 minutes to 2 hours then grinding to a powder of 10 to 100 mesh U.S. Standard.

10. The process of claim 9 when the heating step is carried out at 102° to 225° C. from 3 minutes to 2 hours.

* * * * *